(12) United States Patent
Kjeldsen et al.

(10) Patent No.: US 8,100,676 B2
(45) Date of Patent: Jan. 24, 2012

(54) ROTOR, A METHOD FOR PRODUCING SUCH ROTOR AND A PUMP COMPRISING SUCH ROTOR

(75) Inventors: Ole Kjeldsen, Struer (DK); Ole Frederiksen, Skive (DK); Lars Primholdt, Skive (DK)

(73) Assignee: Inter-Ice Pump APS, Skive (DK)

( * ) Notice: Subject to any disclaimer, the term of this patent is extended or adjusted under 35 U.S.C. 154(b) by 839 days.

(21) Appl. No.: 11/913,719

(22) PCT Filed: May 8, 2006

(86) PCT No.: PCT/DK2006/050018
§ 371 (c)(1),
(2), (4) Date: Apr. 23, 2008

(87) PCT Pub. No.: WO2007/031092
PCT Pub. Date: Mar. 22, 2007

(65) Prior Publication Data
US 2008/0219877 A1 Sep. 11, 2008

(30) Foreign Application Priority Data
May 6, 2005 (DK) ................................. 2005 00667

(51) Int. Cl.
*F01C 5/00* (2006.01)
*F03C 2/00* (2006.01)
*F03C 4/00* (2006.01)
(52) U.S. Cl. ............. 418/153; 418/1; 418/132; 418/178; 418/206.1; 418/206.9; 264/250; 264/255

(58) Field of Classification Search .... 418/206.1–206.9, 418/152, 154, 155, 178, 131, 132, 153, 1; 264/239, 250, 255
See application file for complete search history.

(56) References Cited

U.S. PATENT DOCUMENTS

| 2,530,767 | A | * | 11/1950 | Wilson | ................ | 418/153 |
| 2,848,952 | A | | 8/1958 | Wakeman | | |
| 3,015,283 | A | | 1/1962 | Knipp | | |
| 3,526,470 | A | * | 9/1970 | Swanson | ................ | 418/15 |
| 4,846,642 | A | | 7/1989 | Nuber et al. | | |
| 5,011,389 | A | | 4/1991 | Timuska | | |
| 5,219,499 | A | | 6/1993 | Timuska | | |

(Continued)

FOREIGN PATENT DOCUMENTS

GB 581224 7/1944
(Continued)

*Primary Examiner* — Theresa Trieu
(74) *Attorney, Agent, or Firm* — Merchant & Gould P.C.

(57) ABSTRACT

The invention relates to a rotor for a positive displacement rotary pump. The rotor comprises a hub with an aperture and a center axis through aperture and at least 2 lobes radially extending from hub and in a direction essentially perpendicular to the axis of hub. The rotor comprises a core of a first polymer material and a cover of a second polymer material, which second polymer material has a hardness which is lower than the first polymer material. The first and the second polymer materials are connected to each other. The hub or the major part of the hub is preferably provided by the core, whereas at least a part of the lobes is provided by the cover. The invention also relates to a method of providing the rotor and a pump comprising the rotor.

37 Claims, 2 Drawing Sheets

| U.S. PATENT DOCUMENTS | | | | FOREIGN PATENT DOCUMENTS | | |
|---|---|---|---|---|---|---|
| 5,387,750 A | 2/1995 | Chiang | | GB | 583940 | 1/1945 |
| 6,688,867 B2 * | 2/2004 | Suman et al. ............ 418/178 | | GB | 2126655 | 9/1982 |
| 6,863,981 B2 | 3/2005 | McBain | | | | |
| 2002/0043124 A1 | 4/2002 | Shiga et al. | | * cited by examiner | | |

US 8,100,676 B2

ROTOR, A METHOD FOR PRODUCING SUCH ROTOR AND A PUMP COMPRISING SUCH ROTOR

TECHNICAL FIELD

The present invention relates to a rotor for a positive displacement pump as well as a method for producing such rotor and a pump comprising one or more of such rotors.

BACKGROUND ART

Positive displacement pumps, such as gear-tooth rotary pumps are well known in the art. Such pumps are generally used for the transport of fluid substances such as more and less viscous liquids, pastes and suspensions. Positive displacement pumps usually comprise at least two rotors, also referred to as pumping wheels, pumping gears and impellers.

GB patent No. 583,940 discloses a positive displacement pump comprising pumping wheels having elastic teeth or teeth with a cover layer of an elastic material. The core part of the wheel is made from a rigid material, such as a metal or a synthetic resin. The cover layer is shaped as an envelope for the teeth of the pumping wheel and is applied by endwise sliding it onto the tooth stubs. An end disc of harder material is applied for providing axial sealing on each side of the wheels. The cover layer has shown to have a relatively short durability, in particular if the pumped substance has a relatively high viscosity. Furthermore the pump has shown to have a relatively high power consumption, which among other things can be attributed to a high friction between the resilient cover material and the pumping house.

U.S. Pat. No. 2,848,952 discloses another pump comprising impellers comprising a metallic hub and a plastic cover covering the end faces of the impellers and comprising a marginal boss. The pump is arranged so that the pumped medium simultaneously is acting as lubricant between the impellers and the casing (pumping house).

SUMMARY OF INVENTION

The object of the invention is to provide a rotor for a positive displacement pump, which rotor has a high durability and strength, provides a safe sealing and a relative low friction to the pumping house in use and is simple to produce.

This object has been achieved by the invention as it is defined in the claims.

The rotor of the invention comprises a hub with an aperture and a centre axis through said aperture and at least 2 lobes extending radially from said hub and in a direction essentially perpendicular to the axis of said hub. The rotor may comprise 3, 4, 5 or even more lobes, such as for example up to 50 lobes. The shapes of such rotors with lobes are well known in the art, and as examples of the lobe shape of the rotor of the invention, reference is made to the rotor shapes shown in GB 583940, U.S. Pat. No. 2,848,952 and U.S. Pat. No. 4,846,642 FIG. 6.

The rotor comprises a core of a first polymer material and a cover of a second polymer material, wherein the second polymer material has a hardness which is lower than the first polymer material and wherein the first and the second polymer materials are connected to each other.

It has thus been found that when the core is of a polymer material and comprises a cover layer, preferably at least covering the part of the rotor adapted to be in contact with the pumping house, the sealing efficacy is highly improved compared with using a metal as core. Besides, the fact that the two materials are connected results in an even more safe sealing without need for pressing the rotor hard against the inner side of the pumping house. Thereby a very tight sealing can be obtained simultaneously with a reduced use of friction between the rotors and the inner side of the house, which thereby reduces both the necessary amount of power required for driving the pump and the wear of the rotors. The durability of the rotors is therefore very high compared with prior art rotors.

The first and the second polymer should preferably be connected to each other along all of their interface. In one embodiment, the first and the second polymer materials are integrated with each other, which means that the materials are consolidated to one unit which cannot be separated without damaging one or both of the material parts.

The interconnection between the first and the second materials may in principle be of any kind. The first and the second materials comprise an interface along which the materials are connected at least partly, preferably along all of the interface. In one embodiment, the first and the second polymer materials are physically or chemically bound to each other in the interface.

The physical bonding along the interface may for example be a partly interpenetration of one of the polymers into the other one of the polymers. In one embodiment, the first and the second polymer materials are anchored into each other in said interface.

In one embodiment wherein the first and the second polymer materials are chemically bonded to each other in said interface, the chemical bonding includes at least one of van der Waahls forces, hydrogen bonds, covalent bonds and ionic bonds.

In one embodiment, the first and the second polymer materials are bonded to each other via an intermediate bonding layer, such as a glue or a cement. Such an intermediate bonding layer should preferably be relatively thin, such as of a thickness of 1 mm or less, e.g. 0.5 mm or less. When using an intermediate bonding layer, it is preferred that it is of a polymer based glue. It is desired that the strength of the connection between the first and the second polymer should be relatively strong in order for the connection to be stable in use, where the bonding may be subjected to high compression, friction forces and other mechanical forces. If the connections between the materials are too weak, the two materials may totally or partly disconnect, with the result that the sealing properties will deteriorate, and the pumping effect will decrease. The connection strength needed depends largely on the size of the rotors, the sizes of the lobes and the type of medium to be pumped.

In one embodiment, the first and the second polymer materials have an interface which has a cohesiveness which is at least as strong as the cohesiveness of one of the two polymer materials. In this embodiment the risk of the material being disconnected is extremely low, even when the rotor is in pumps which are subjected to high forces. The cohesiveness between the two materials can be measured by a tear test seeking to tear two connected material units apart. If the element subjected to the test is torn in the interface, the connection between the materials has a lower cohesiveness than both of the materials, if—on the other hand—the element is torn in one of the materials outside the interface, the connection between the materials has a higher cohesiveness than the torn material.

Hardness of a material in this invention relates to the macro hardness of the material. The hardness testing of plastics is most commonly measured by the Shore (Durometer) test or Rockwell hardness test. Both methods measure the resistance of the plastic toward indentation. Both scales provide an empirical hardness value that doesn't correlate to other properties or fundamental characteristics. Shore Hardness, using either the Shore A or Shore D scale, is the preferred method for rubbers/elastomers and is also commonly used for 'softer' plastics such as polyolefins, fluoropolymers, and vinyls. The Shore A scale is used for 'softer' rubbers, while the Shore D scale is used for 'harder' ones. The Shore hardness is the relative hardness of polymer materials such as rubber, hard or soft plastics. This hardness can be determined with an instrument called a Shore A or Shore D durometer. If the indenter completely penetrates the sample, a reading of 0 is obtained, and if no penetration occurs, a reading of 100 results. The reading is dimensionless. The Shore A scale and Shore D scale partly overlap, which means that many materials can both be measured using Shore A and Shore D. The durometer test used herein is made according to ASTM D2240/ISO 868.

In one embodiment of the invention the first polymer material has a hardness which is at least 1 Shore unit, such as 3 Shore units, such as at least 5 Shore A units, such as at least 10 Shore units, such as at least 15 Shore units higher than the Shore value of the second material, wherein the Shore unit is selected from Shore A and Shore D.

Materials that differ in hardness with 15 Shore or less can usually be measured both with either Shore A durometer or Shore D durometer.

In one embodiment, the first polymer material has a hardness which is at least 95 Shore A, such as at least 97 Shore A, such as at least 98 Shore A, such as at least 99 Shore A, such as 100 Shore A or higher.

The hardness of the first polymer should preferably be relatively high in order to provide strength to the rotor as well as in order to supply a stable support for the cover material. If the first polymer is too soft, the lobes may be twisted and torn, and the friction against the inner pumping house surface may be increased to an undesired level.

In one embodiment it is thus preferred that the first polymer material has a hardness which is at least 55 Shore D, preferably at least 60 Shore D, such as at least 70 Shore D, such as at least 80 Shore D.

The hardness of the first polymer may also be measured using a Rockwell tester. The Rockwell Hardness test is a hardness measurement based on the net increase in depth of impression as a load is applied. Hardness numbers have no units and are commonly given in a number of different scales. The higher the number in each of the scales is, the harder the material is.

In one embodiment, the first polymer material has a Rockwell R hardness which is at least 75, such as at least 85, such as at least 95, such as at least 100, such as at least 105, such as at least 110.

The second polymer material should have a hardness which is lower than the hardness of the first polymer material. Useful hardness values include in general at least hardnesses within the range between 50 and 98 Shore A.

Even though the hardness of a sealing unit often should be very low for providing a safe sealing, it has been found that this is not necessary in the present invention. Hardnesses in the range between 75 and 98 Shore A or even in the range between 90 and 98 Shore A have thus shown to provide an excellent sealing. This is believed to be caused by the construction wherein the second polymer material connected to the first polymer material provides a not too stiff and yet not too soft support for this second polymer material. Thereby it is possible to use a relatively high Shore hardness material for a sealing material, while still providing a safe sealing without the need of pressing the rotor very hard against the inner side of the pumping house. The second polymer material acting as a supporting material for the first polymer material also results in an interface with a graduating hardness profile, which increases the durability of the rotor.

In one embodiment, the second polymer material has a hardness of 98 Shore A or less, such as 96 Shore A or less, such as 90 Shore A or less, such as 85 Shore A or less.

In one embodiment, the second polymer material has a hardness of at least 75 Shore A, and preferably a rebound resilience of at least 40%, such as at least 45%, such as at least 50% (ISO 4662).

In one embodiment, the first polymer material has a tensile modulus (ISO 527) of at least 100 Mpa, such as at least 500 Mpa, such as at least 800 Mpa, such as at least 1000 Mpa, such as at least 1500 Mpa. A polymer which has such tensile modulus has shown to provide an excellent support for the first polymer material.

The first polymer may be a thermoset polymer or a thermoplastic polymer. It is, however, in general desired that the first material is a material which can be injecting moulded for simple production.

In one embodiment of the invention the first polymer material is a thermoset polymer, such as a cross-linked polyurethane and a cross linked polyolefin. Thermoset polymers usually have a high strength, while simultaneously having a more elastic surface than metal. In one embodiment the thermoset polymer is a peroxide activated polymer, wherein peroxide is added to form free radical upon activation, which may be initiated by adding heat or by irradiation e.g. using infrared irradiation.

In one embodiment, the first polymer material is thermoplastic elastomer (TPE), such as a material selected from the group of TPE block copolymer, such as SEBS, SBS, SIS, TPE-polyether-amide, TPE-polyether-ester, TPE-urethanes, TPE PP/NBR, TPE-PP/EPDM, TPE-vulcanisates and TPE-PP/IIR; polyolefin, such as polyvinylpyrrolidone, polyethylene, polypropylene, polybutylene including its isomers; thermoplastic polyurethane (TPU); Polyamide (Pa); Polyester, and mixtures thereof.

In one embodiment, the TPE for the first material is selected from the group consisting of Styrene based TPE, Olefin based TPE, Urethane based TPE (e.g. TPU), Ester based TPE and Amide based TPE.

Most preferred polymers for the first polymer material include polyester based TPU and Polyamide (PA). As an example the PAs sold by CP-Polymer-Technik GmbH & Co KG, under the trademark Wellamid® 6000 PA6/6600 PA66 have shown to be very useful for the first polymer material. Such PA has a hardness of 75-80 Shore D or higher and 95-100 Rockwell R or higher. The higher hardness is obtained by fillers or blending with other materials. A PA with reinforcement filler in the form of 30% by weight of glass fibers has a hardness of about 89 Shore D and 120 Rockwell R. In particular Wellamid® 6000 GV 30 HWCP (comprising 30% by weight of glass fibers) has shown to be an excellent choice for the first polymer material.

The second polymer may preferably be a thermoplastic elastomer, such as a material selected from the group of TPE block copolymer, such as SEBS, SBS, SIS, TPE-polyether-amide, TPE-polyether-ester, TPE-urethanes, TPE PP/NBR, TPE-PP/EPDM, TPE-vulcanisates and TPE-PP/IIR; polyolefin, such as polyvinylpyrrolidone, polyethylene, polypropylene, polybutylene including its isomers; thermoplastic polyurethane (TPU); Polyamide (Pa); Polyester, and mixtures thereof.

In one embodiment, the TPE for the second material is selected from the group consisting of Styrene based TPE, Olefin based TPE, Urethane based TPE (e.g. TPU), Ester based TPE and Amide based TPE.

In one embodiment, the second polymer material is a polyester based TPU.

An example of highly useful TPUs includes the polyester based TPU sold by Noveon Europe BVBA under the trade name ESTANE®. In particular ESTANE® 58212 NAT 021/022 has shown to be an optimal choice for the second polymer material. This polymer has a hardness of 94 Shore A/42 Shore D.

The first polymer may in one embodiment comprise reinforcement filler. Any reinforcement filler can in principle be used. Preferred reinforcement fillers include glass beads, glass fibres, metal particles, metal fibres, carbon black, mineral fibres, talcum, carbonates, mica, silicates and mixtures thereof.

Also the second polymer may comprise reinforcement fillers, however, in a lesser amount than the first polymer.

The amount of reinforcement polymer in the first polymer material may in principle be as large as the polymer matrix possibly can take without disintegrating. In practice the amount of reinforcement filler in the first polymer can be up to about 60% by weight, such as between 1 and 55% by weight. Optimally the amount of reinforcement filler in the first polymer material is up to about 40% by weight such as between 5 and 30% by weight.

The amount of reinforcement filler in the second polymer will normally not increase 20% by weight, such as up to 10% by weight.

In one embodiment, the first and the second polymer may advantageously have polymeric compositions at least partly comprising identical polymers. Such composition element identity may result in an increased bonding between the first and the second polymer, and in particular it will be possible to establish covalent bonding between the first and the second polymer if they have a composition element identity. In one embodiment the first and the second polymer have polymeric compositions with an identity of at least 50% by weight, such as at least, 60% by weight, such as at least 70% by weight, such as at least 80% by weight, such as at least 90% by weight, such as at least 95% by weight. In this embodiment, it is particularly preferred that the first polymer comprises a higher amount of reinforcement filler than the second polymer. As a preferred example of this embodiment should be mentioned an embodiment comprising TPU as both the first and the second polymer, but wherein the first polymer is harder than the second polymer e.g. due to the length of the polymer chain, the branching of the polymer chain and/or in particular the filling degree of reinforcement fillers.

The first as well as the second polymer may individually of each other also comprise other additives such as adhesion promoters (such as for 2K-constructions), process and plasticizing oils, antioxidants and pigments.

The lobes comprise a front surface defined as the surface of the lobes parallel to and turned away from the axis of the hub. In one embodiment, the second polymer constitutes at least the major part of the front surface of the lobes, such as at least 50%, such as preferably all of the front surface of the lobes. It is particularly preferred that the parts of the front surface of the lobes, which are arranged to be in contact with walls of a pumping house are provided by the second material, in order to provide a safe sealing.

The hub of the rotor may preferably at least partly be provided by the core, i.e. by the first material. In one embodiment, all of the hub is provided by the core.

The aperture in the hub comprises an inner surface arranged to be engaged with a driving shaft. In one embodiment, this aperture surface comprises angled planes capable of cooperating with a driving shaft. The planes may e.g. be arranged to form a triangular cross section, a square cross section or any other polygonal cross section.

In one embodiment, the aperture surface is provided essentially by the first polymer material.

In one embodiment, the aperture surface is provided essentially by the second polymer material. The aperture surface may in this embodiment preferably be provided by a thin aperture layer of the second polymer material applied onto the core. The thin aperture layer preferably has a thickness of up to about 4 mm, such as between 0.1 and 2 mm. This thin aperture layer may result in an increase durability of the rotor, and in particular the risk of micro inner cracks in the hub part may be reduced.

The rotor comprises a first and a second side perpendicular to the axis of the hub. In one embodiment, on at least one of its first and second side the rotor preferably comprises a lip surrounding the hub aperture, and protruding from said side. In general in this embodiment it is preferred that the rotor comprises a lip on both of its first and second side.

The lip has a width measured as its radial width parallel to the side of the rotor from where it protrudes, and a height measured as its extension from and perpendicular to the side of the rotor from where it protrudes. The width and the height respectively, and individually of each other are preferably up to 15 mm, such as between 1 and 8 mm, such as between 2 and 4 mm.

The lip(s) may in principle surround the hub in any distance from the aperture. In one embodiment, the lip(s) surrounds the hub in a curved shape corresponding to the shape of the lobes. In order to avoid slits and cracks it is in one embodiment desired that the lip(s) are arranged along the front surface of the lobes.

It is preferred that the lip or lips are provided by the second polymer material.

The rotor comprises a first and a second side perpendicular to the axis of the hub, and a width defined as the distance between said first and second side and the height of any optional lip. The width of the rotor may in principle be as high as the driving shafts and the pumping power allow. In practice the width of the rotor is preferably between 5 and 200 mm, such as between 10 and 100 mm.

In one embodiment, the rotor comprises a core with an aperture surface arranged to co-operate with a driving shaft, the core consists of a glass fiber armed polymer, such as nylon e.g. with an amount of glass fibers from 20 to 45 weight %, such as about 30 weight %. The rotor further comprises and an elastomer cover layer chemically bonded to the core. The elastomer cover layer may preferably be of TPU. The elastomer cover layer is arranged to form a sealing against a pump house and an engaged rotor when mounted in a pump, and includes a lip B along the lobe profile on each side of the rotor. In this embodiment the lip has a width between 1 and 8 mm, such as between 4 and 5 mm.

The invention also relates to a positive displacement rotary pump comprising at least two rotors, at least one of the rotors being a rotor according to the invention and as described above.

The remaining elements of the positive displacement rotary pump may be as in any prior art positive displacement rotary pump e.g. as the pump disclosed in GB 583940, U.S. Pat. No. 2,848,952 and U.S. Pat. No. 4,846,642, U.S. Pat. No. 4,938,670. The rotors in the pump may have equal or different number of lobes, and the pump may comprise more than 2 rotors, such as 3, 4, 5 or even more. Normally a positive displacement rotary pump comprises 2 rotors, which is also preferred in the present invention.

The rotors should preferably be arranged to be in engagement with each other.

In one embodiment, the positive displacement rotary pump comprises rotors which are essentially identical.

The invention also relates to a method of producing the rotor. The method comprises providing a core with a hub from a first polymer material, and injecting moulding a second polymer material to cover at least a part of said core.

For simple production it is generally desired that both the core and the cover are provided by injecting moulding, however, in one embodiment the core may be provided by casting.

In one embodiment the method comprises
applying the first polymer material in a first core cavity of a double cavity mould,
removing the part of the mould defining the core cavity to provide a cover cavity, and
applying the second polymer into the cover cavity, and removing the resulting rotor from the mould.

In one embodiment the method comprises
applying the first polymer material in a first mould,
removing the core from the first mould and placing it in a second mould having a larger moulding cavity than the first mould, and
applying the second polymer into the second mould, and removing the resulting rotor from the second mould.

In this embodiment the first material may e.g. be thermoset polymer such as the polymer disclosed above. The core should preferably be subjected to cross linking prior to injecting moulding of the second material.

In one embodiment the method comprises
applying the second polymer material in a first cavity shaped as the cover, and arranged with the outer couture of the rotor and with a blind core-shaped mould element,
removing the blind core-shaped mould element, and
applying the second polymer into the core cavity, and removing the resulting rotor from the mould.

In one embodiment, the first and the second polymer may be provided in the same mould using injecting moulding.

The skilled person will be able to select desired casting processes and injection moulding processes and equipments to be applied in the method of the invention. Examples of useful injection moulding equipment and processes are disclosed in U.S. Pat. No. 4,668,460, U.S. Pat. No. 5,387,750 and U.S. Pat. No. 6,863,981.

The rotors and pumps provided by the present invention are highly useful for pumping foodstuffs and pharmaceuticals, since they are very simple and easy to clean. The rotors can be made from materials which can withstand aggressive cleaning chemicals, and furthermore the rotors are unlikely to form cracks due to the combination of materials and their construction. The rotors and pumps provided by the present invention are in particular useful in the production of ice cream.

BRIEF DESCRIPTION OF DRAWINGS

The invention will be explained more fully below in connection with a preferred embodiment and with reference to the drawings in which:

The figures are schematic and simplified for clarity, and they just show details which are essential to the understanding of the invention, while other details are left out. Throughout the same reference numerals are used for identical or corresponding parts.

FIG. 1 shows a pumping house consisting of a frame 1, and a first and a second end plate 2, 3. The first end plate 2 comprises apertures 4, 5 for driving shafts.

Figure 1:
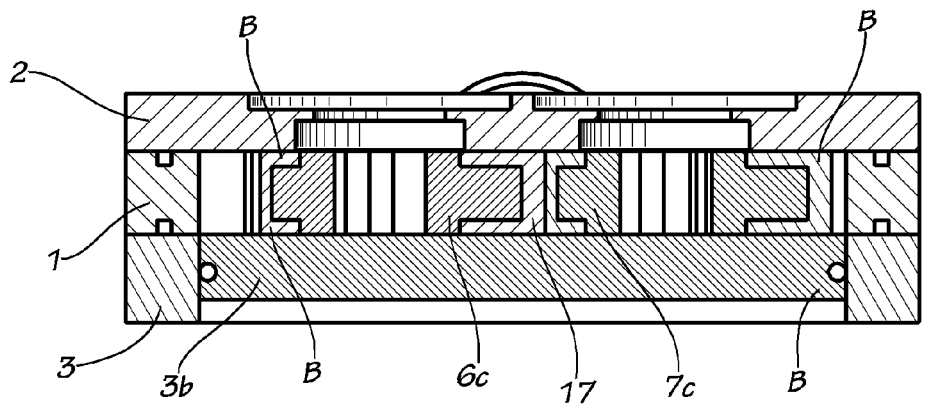
FIG. 1 is a perspective and partly exploded view of a pump according to the invention.

Inside the pumping house provided by the frame 1 and the end plates 2, 3 two rotors 6, 7 are arranged. The rotors 6, 7 engage with each other and are arranged to rotate in opposite directions. At least one of the rotors, preferably both are according to the invention. In the shown embodiment, the rotors have 5 lobes. As described above the rotors could as well have another number of lobes, which could be equal or different from one rotor to another.

The rotors 6, 7 each comprise a hub 16 with an aperture. Said aperture comprises an aperture surface 10. As it can be seen the aperture is square shaped and the aperture surface 10 has angled planes capable of cooperating with a driving shaft. The driving shafts for use in combination with the shown pump should thus comprise an end section with a square shaped cross section corresponding to the aperture surface 10 and the square shape of the apertures in the rotors. The driving shafts can be inserted through the apertures 4, 5 and into the apertures of the rotors for engagement therewith.

Each rotor comprises a hub 16 and a number of lobes 6', 7' extending radially from the hub and thereby also radially from the aperture. The lobes 6', 7' have tops and bottoms 7". The front surface 14 of the lobes 6, 7 is essentially parallel to the axis of the rotor and comprises also tops 23 and bottoms 24.

Each rotor 6, 7 also comprises a lip B, arranged on one or both of its sides. As shown the lip B is arranged to follow the contour of the lobes 6, 7 and is placed along the front surface 12, 13, 14 of the lobes 6, 7, to thereby provide a part of the lobe front surface 12, 13, 14. The lip B is made from the second polymer material, and due to method of its production, the selection of the materials and the fixation of the materials to each other, it has been found that the lip B provides a surprisingly superior sealing towards the end plates 2, 3. In prior art pumps similar end plates and the remaining part(s) of the pumping house need to be joined by high compression forces, so that the sides of the rotors e.g. comprising a prior art lip are pressed with high force against the end plate in order to provide a safe sealing. In the present invention the lip B need not be pressed with particular high force against the end plates 2, 3 in order to provide a safe sealing. The safe sealing can thus easily be provided no matter whether the medium to be pumped is an ice crystal suspension, a water containing paste, a chemical solution or another fluid medium. The sealing is furthermore very stable and long lasting even if the pumped medium comprises small particles and similar solid matter.

In use the rotors will turn in opposite directions, e.g. the left rotor 6 turns counter-clockwise, and the right rotor 7 will turn clockwise, and thereby the medium e.g. a paste, a suspension or a liquid fed via supply pipe 8 will be transported through the pump to an outflow with an outflow pipe 9, 9'. The rotors form a tight seal to inner wall 15 of the frame 1 along half circle shaped section of the inner frame wall 15, and furthermore the rotors 6, 7 form a tight seal to each other where one of the lobe tops 6' of a first rotor 6 is in contact with a lobe bottom 7" of the other rotor 7.

Figure 2:
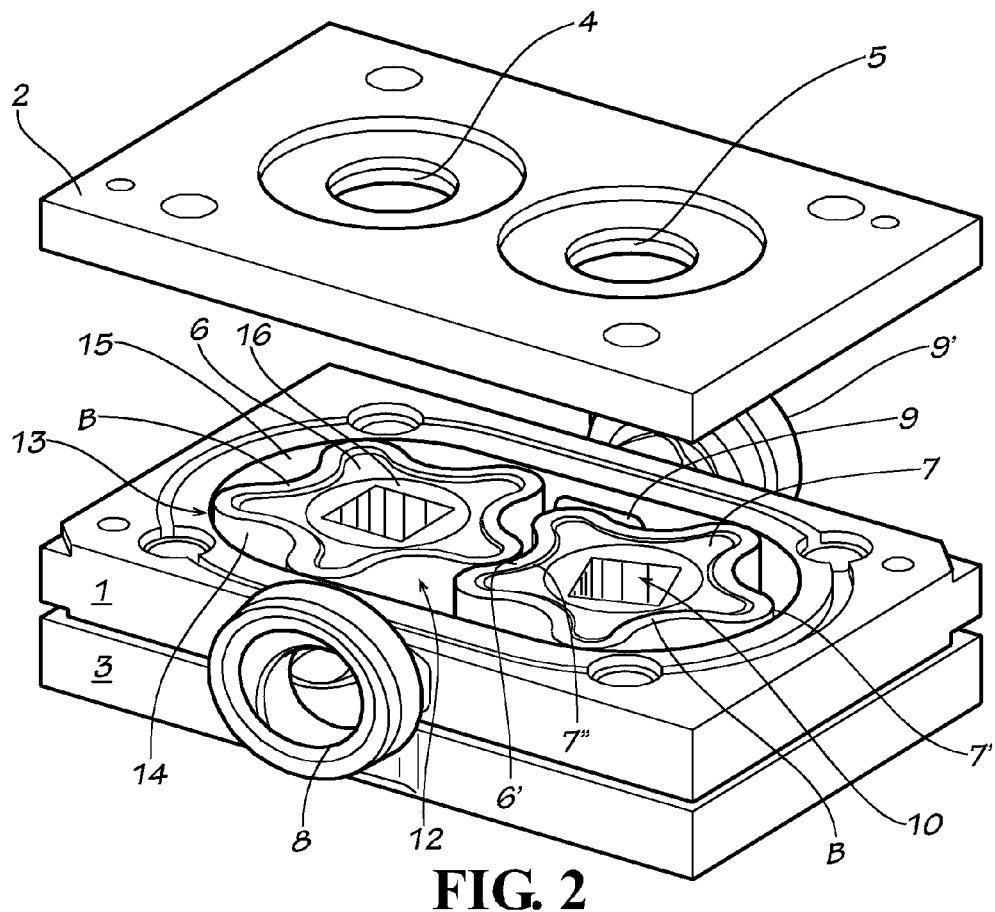
FIG. 2 is a cross-sectional side view of a pump according to the invention.

FIG. 2 shows a pump of the invention seen in a cross-sectional side view. In this embodiment one of the end plates 3 is supplied with a contact plate 3b, which is provided to form the sealing towards the lip B. This contact plate 3b may e.g. be of another material than the material of which the end plate 3 is made, e.g. another metal or metal alloy, or the contact plate 3b may comprise a coating of another metal. Each rotor 6, 7 comprises a core 6c, 7c of a first material providing the hub and a part of the lobes, and a cover 17 of a second material covering the lobes 6', 7' preferably on all of its sides. The same configuration of the rotor can be seen on FIGS. 3 and 4.

Figure 3:
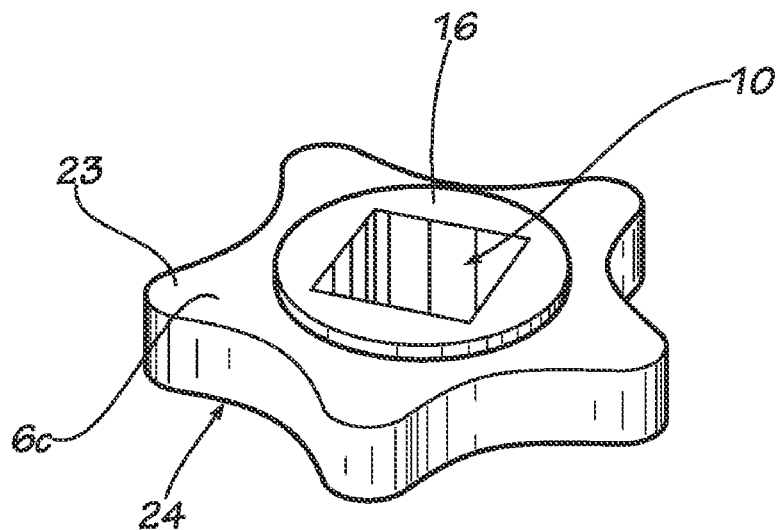
FIG. 3 is a perspective view of a core to a rotor according to the invention.
Figure 4:
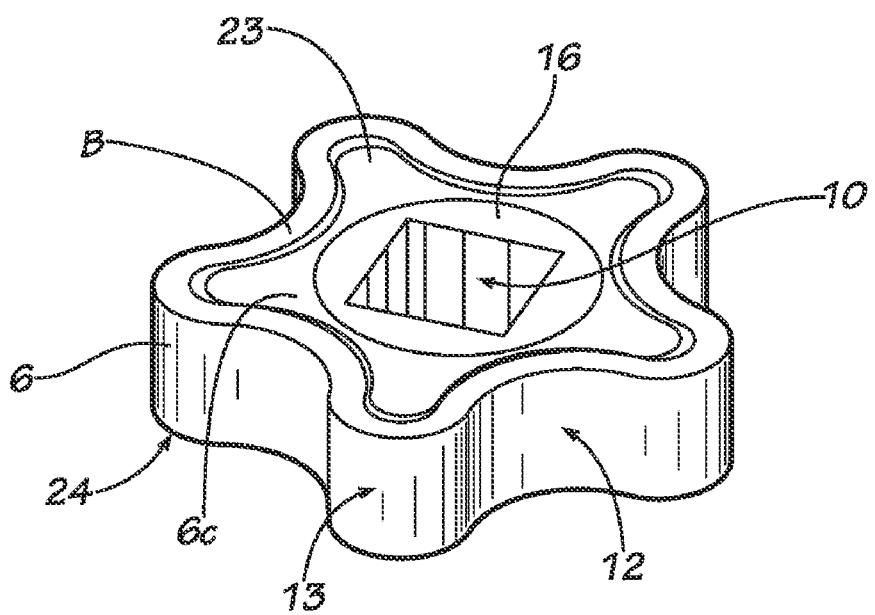
FIG. 4 is a perspective view of a rotor according to the invention.

The rotor shown in FIGS. 3 and 4 is produced by first providing the core 6c of a first material, such a glass fiber armed polymer (e.g. PA). This core 6c is centred with a fixing element in a mould cavity and a second polymer, e.g. TPU is applied in the mould cavity e.g. using injecting moulding to cover the core 6c. After cooling the rotor is ready for use. Due to the production method the rotor need not be subjected to additional surface treatment.

The invention claimed is:

1. A rotor for a positive displacement rotary pump, the rotor comprising a hub with an aperture and a centre axis through said aperture and at least two lobes radially extending from said hub and in a direction essentially perpendicular to the axis of said hub, said rotor comprising a core of a first polymer material and a cover of a second polymer material, which second polymer material has a hardness which is lower than the first polymer material wherein the first polymer material has a Rockwell R hardness which is at least 75 and wherein the first and the second polymer materials are connected to each other.

2. A rotor as claimed in claim 1 wherein the first and the second polymer materials are integrated with each other.

3. A rotor as claimed in claim 1, wherein the first and the second polymer materials have an interface, and the first and the second polymer materials are physically or chemically bonded to each other in said interface.

4. A rotor as claimed in claim 3 wherein the first and the second polymer materials are anchored into each other in said interface.

5. A rotor as claimed in claim 4 wherein the first and the second polymer materials are chemically bonded to each other in said interface, the chemical bonding includes at least one of a covalent and an ionic bond.

6. A rotor as claimed in claim 1, wherein the first and the second polymer materials have an interface which has a cohesiveness which is at least as strong as the cohesiveness of one of the two polymer materials.

7. A rotor as claimed in claim 1, wherein the first polymer material has a hardness which is at least 1 Shore unit, such as 3 Shore units higher than a Shore value of the second material, wherein the Shore unit is selected from Shore A and Shore D.

8. A rotor as claimed in claim 1, wherein the first polymer material has a hardness which is at least 95 Shore A, such as at least 97 Shore A.

9. A rotor as claimed in claim 1, wherein the second polymer material has a hardness of 98 Shore A or less, such as 96 Shore A or less.

10. A rotor as claimed in claim 1, wherein the second polymer material has a hardness of at least 75 Shore A, and a rebound resilience of at least 40, such measured according to ISO 4662.

11. A rotor as claimed in claim 1, wherein the first polymer material has a tensile modulus measured according to (ISO 527) ISO 527 of at least 100 Mpa, such as at least 500 Mpa, such as at least 800 Mpa, such as at least 1000 Mpa, such as at least 1500 Mpa.

12. A rotor as claimed in claim 1, wherein the first polymer material is a thermoset polymer.

13. A rotor as claimed in claim 1, wherein the first polymer material is thermoplastic elastomer, such as a material selected from the group of TPE block copolymer; polyolefin; thermoplastic polyurethane (TPU); Polyamide (Pa); Polyester, and mixtures thereof.

14. A rotor as claimed in claim 13, wherein the first polymer material is a polyester based TPU or a Polyamide (PA).

15. A rotor as claimed in claim 1, wherein the second polymer material is a thermoplastic elastomer from the group of TPE block copolymer; polyolefin; thermoplastic polyurethane (TPU); Polyamide (Pa); Polyester, and mixtures thereof.

16. A rotor as claimed in claim 15, wherein the second polymer material is a polyester based TPU.

17. A rotor as claimed in claim 1, wherein the first polymer material comprises a reinforcement filler.

18. A rotor as claimed in claim 17, wherein the amount of reinforcement filler in the first polymer is up to 60% by weight.

19. A rotor as claimed in claim 1, wherein the first and the second polymers have polymeric compositions with an identity to each other of at least 50% by weight.

20. A rotor as claimed in claim 19, wherein the first polymer comprises a higher amount of reinforcement filler than the second polymer.

21. A rotor as claimed in claim 1, wherein the first and the second polymer are TPU.

22. A rotor as claimed in claim 1, wherein at least one of the first and the second polymers comprises additives selected from the group consisting of adhesion promoters, process and plasticizing oils, antioxidants and pigments.

23. A rotor as claimed in claim 1, wherein the rotor comprises at least three lobes.

24. A rotor as claimed in claim 1, wherein the lobes comprise a front surface defined as the surface of the lobes parallel to and turned away from the axis of the hub, and said second polymer constitutes at least the major part of the front surface of the lobes.

25. A rotor as claimed in claim 1, wherein the hub is at least partly provided by the core.

26. A rotor as claimed in claim 1, wherein the aperture comprises an aperture surface, said aperture surface comprising angled planes configured to cooperate with a driving shaft.

27. A rotor as claimed in claim 1, wherein the aperture surface is provided essentially by the first polymer material.

28. A rotor as claimed claim 1, wherein the aperture surface is provided essentially by the second polymer material.

29. A rotor for a positive displacement rotary pump, the rotor comprises a hub with an aperture and a centre axis through said aperture and at least 2 lobes radially extending from said hub and in a direction essentially perpendicular to the axis of said hub, said rotor comprises a core of a first polymer material and a cover of a second polymer material, which second polymer material has a hardness which is lower than the first polymer material and the first and the second polymer materials are connected to each other, wherein the rotor comprises a first and a second side perpendicular to the axis of the hub, and on at least one of said first and second sides the rotor comprises a lip surrounding the hub aperture and protruding from said side.

30. A rotor as claimed in claim 29, wherein the lip has a width and a height, and wherein the width and the height, respectively, and individually of each, other are up to 15 mm.

31. A rotor as claimed in claim 29, wherein the lip or lips surround the hub in a curved shape corresponding to the shape of the lobes.

32. A rotor as claimed in claim 29, wherein the lip or lips are provided by said second polymer material.

33. A rotor for a positive displacement rotary pump, the rotor comprises a hub with an aperture and a centre axis through said aperture and at least 2 lobes radially extending from said hub and in a direction essentially perpendicular to the axis of said hub, said rotor comprises a core of a first polymer material and a cover of a second polymer material, which second polymer material has a hardness which is lower than the first polymer material and the first and the second polymer materials are connected to each other, wherein the rotor comprises a first and a second side perpendicular to the axis of the hub, and said rotor has a width defined as the distance between said first and second side plus the height of any optional lip, said width of the rotor preferably being between 5 and 200 mm.

34. A method of producing a rotor for a positive displacement rotary pump, the rotor comprises a hub with an aperture and a centre axis through said aperture and at least 2 lobes radially extending from said hub and in a direction essentially perpendicular to the axis of said hub, said rotor comprises a core of a first polymer material and a cover of a second polymer material, which said second polymer material has a hardness which is lower than the first polymer material and wherein the first and the second polymer materials are connected to each other, said method comprises providing said core with said hub from said first polymer material, and injecting moulding said second polymer material to cover at least a part of said core wherein the method comprises applying the first polymer material in a first core cavity of a double cavity mould, removing the part of the mould defining the core cavity to provide a cover cavity, and applying the second polymer into the cover cavity, and removing the resulting rotor from the mould.

35. A method as claimed in claim 34, wherein both the core and the cover are provided by injecting moulding.

36. A method as claimed in claim 34, wherein the first material being a thermoset polymer, the core preferably being subjected to cross linking prior to injecting moulding of the second material.

37. A method of producing a rotor for a positive displacement rotary pump, the rotor comprises a hub with an aperture and a centre axis through said aperture and at least 2 lobes radially extending from said hub and in a direction essentially perpendicular to the axis of said hub, said rotor comprises a core of a first polymer material and a cover of a second polymer material, which second polymer material has a hardness which is lower than the first polymer material and wherein the first and the second polymer materials are connected to each other, said method comprises providing said core with said hub from said first polymer material, and injecting moulding said second polymer material to cover at least a part of said core, wherein the method comprises applying the second polymer material in a first cavity shaped as the cover, and arranged with the outer contour of the rotor and with a blind core-shaped mould element, removing the blind core-shaped mould element, and applying the second polymer into the core cavity, and removing the resulting rotor from the mould.

* * * * *